Oct. 8, 1968 M. F. WALKER 3,404,545
OLDHAM COUPLING
Filed Oct. 25, 1966 3 Sheets-Sheet 1
FIG. IA
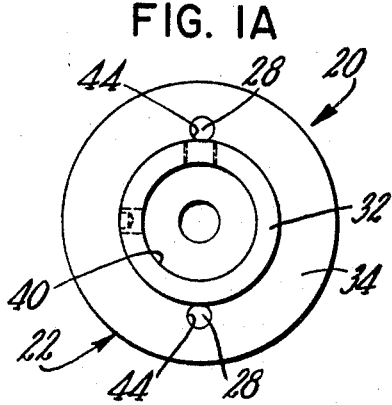
FIG. IB
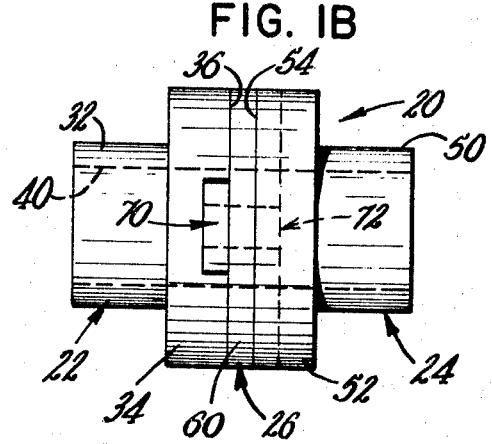
FIG. 2
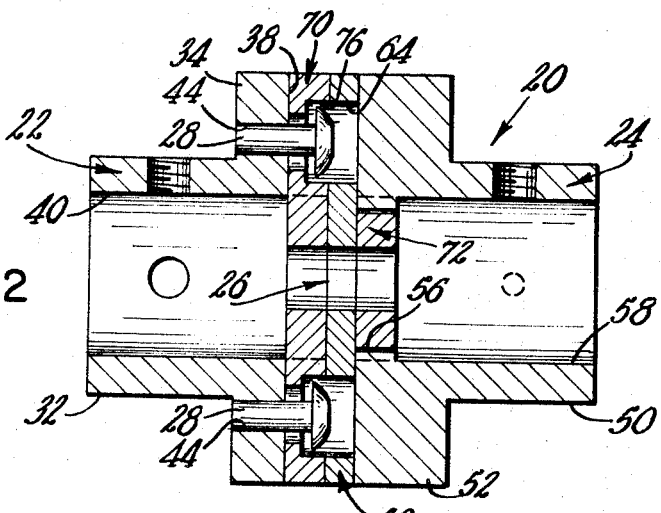
FIG. 3
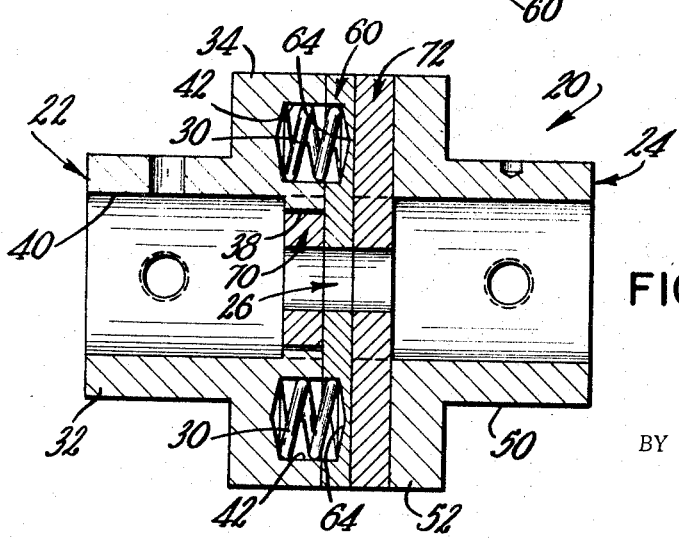
INVENTOR.
MELVIN F. WALKER
BY
Leonard H. King
ATTORNEY Oct. 8, 1968     M. F. WALKER     3,404,545
OLDHAM COUPLING Filed Oct. 25, 1966                       3 Sheets-Sheet 2

INVENTOR.
MELVIN F. WALKER
BY
Leonard H. King
ATTORNEY

Oct. 8, 1968 M. F. WALKER 3,404,545
OLDHAM COUPLING
Filed Oct. 25, 1966 3 Sheets-Sheet 3
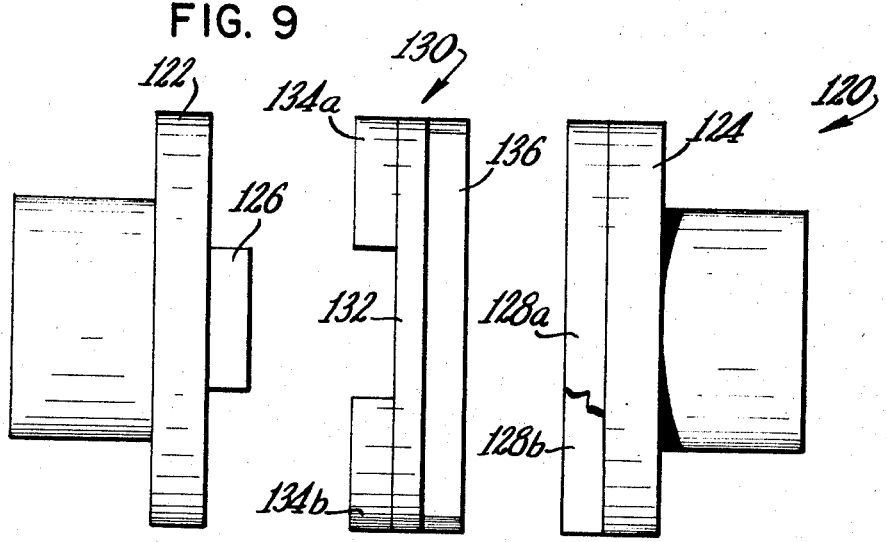
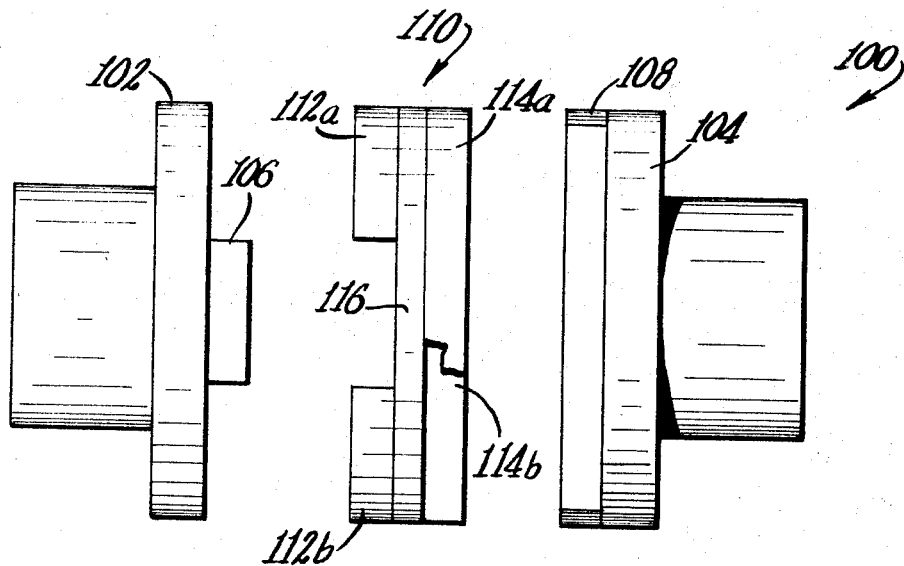
INVENTOR.
MELVIN F. WALKER
BY
Leonard H. King
ATTORNEY

United States Patent Office 3,404,545
Patented Oct. 8, 1968

3,404,545
OLDHAM COUPLING
Melvin F. Walker, Deer Park, N.Y., assignor to
Designatronics, Inc., Mineola, N.Y.
Filed Oct. 25, 1966, Ser. No. 589,264
1 Claim. (Cl. 64—31)

ABSTRACT OF THE DISCLOSURE

An Oldham coupling having captured fasteners. The coupling may be fabricated by welding techniques. The device is characterized by low backlash.

This invention relates generally to devices known as Oldham couplings and more particularly to improved construction thereof.

When axially opposed shafts must be joined, Oldham type couplings are frequently employed in order to compensate for various types of shaft misalignment. Basically, the Oldham coupling is comprised of two end members secured to the shafts and a central member positioned therebetween. The end members and the central member are keyed to each other by a tongue and groove arrangement having axes 90° apart.

In one form of Oldham coupling the central member and one of the end members are loosely fastened to each other. Thus the two elements can move transversely to each other but cannot be separated unless the fasteners are removed. Frequently, however, the fasteners do come loose or fail and since they are located in open ended slots they can fall out. This condition can cause damage to the associated equipment.

The present invention is also comprised of the three members basic to the Oldham coupling but instead of the costly straddle grinding and milling of the tongues and grooves, individual, close tolerance strips are welded to the end members and central member where appropriate. The two end members are usually the same as far as face configuration is concerned. They may both be male or female and the central member may either have two tongues or two grooves.

Alternatively the central member may have one male and one female keying means. The end member opposed to each side of the central member, would then have a mating keying means of opposite configuration. The welding operations are less costly and more accurate than the prior art milling and grinding.

The fasteners used to loosely couple the central member to one of the end members are completely concealed in and captured by counterbored holes instead of the open ended slots used in prior art designs. Thus the fasteners cannot fall out should they loosen or fail. Further, the center member is spring loaded in order to reduce noise and chatter during operation. Because the fasteners are contained in counterbored holes and the prior art design of open ended slots is not required, the outside surface of the present design is substantially free of discontinuities. There are therefore few places for dirt to become lodged. It is also a feature of this invention that the device is inherently balanced and may be operated at higher angular velocities than was previously permitted.

Accordingly, it is an object of this invention to provide Oldham type shaft coupling means having end members and a central member that are less costly to manufacture.

Another object is to provide a shaft coupling of the aforementioned type wherein the end members are substantially the same.

An important object of this invention is that the keying means are separate elements and are physically attached such as by welding to the components comprising the coupling.

A further object is to provide shaft coupling means of the aforementioned type wherein the fasteners are completely enclosed and captured.

An additional object is to provide shaft coupling means as mentioned above that is inherently balanced.

A feature of this invention is that the shaft coupling means has a smooth, continuous external surface.

Another object of this invention is to provide spring biasing means between one of the end members and the central member whereby chattering is reduced.

A particular object is to provide an improved shaft coupling device having smaller backlash error.

A further object is to provide a shaft coupling device as described above wherein the interlocking means are more accurately dimensioned and located.

These and other features, objects and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

In the drawing:

FIG. 1A and FIG. 1B are end and side elevational views respectively of an Oldham type shaft coupling device employing the concepts of this invention;

FIG. 2 is a longitudinal sectional view of the apparatus shown in FIG. 1A and FIG. 1B;

FIG. 3 is another sectional view similar to FIG. 2 but rotated 90° about the longitudinal axis.

FIG. 8 is an exploded side elevational view of a coupling assembly using an alternative configuration; and FIG. 9 is an exploded side elevational view of a coupling assembly using still another alternative tongue and groove arrangement.

Figure 4A:
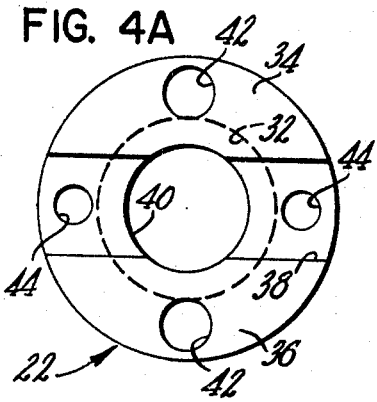
FIGS. 4A, 4B and 4C are front, side and rear elevational views of one end member of this invention.

Referring now to the drawing the improved coupling is generally denoted by the reference character 20 and is seen to comprise three major components, namely, first and second end members 22 and 24 and central member 26. As will be explained in greater detail hereinafter, the central member 26 is loosely coupled to first end member 22 by captive fasteners 28. Biasing means 30 are also included between members 22 and 26.

Figure 4B:
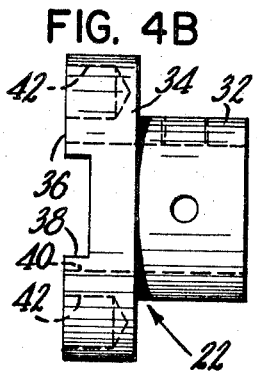
Figure 4C:
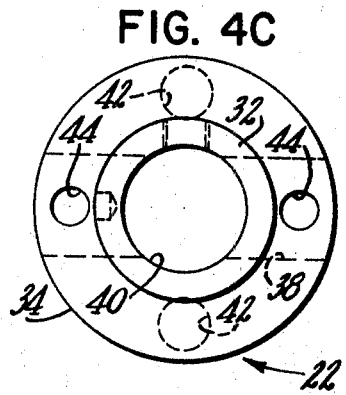
Figure 5A:
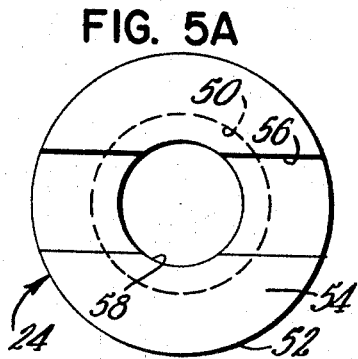
FIGS. 5A, 5B and 5C are front, side and rear elevational views of the other end member.
Figure 5B:
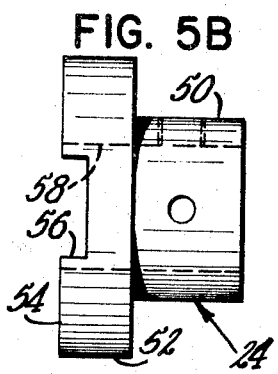
Figure 5C:
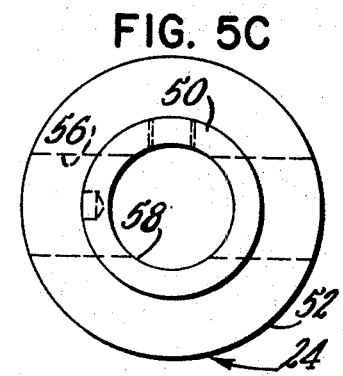

The first end member shown in FIGS. 4A, 4B and 4C includes a cylindrical portion 32 and an enlarged hub 34 having a transverse end face 36. Slot 38 is formed in the end face in a plane perpendicular to longitudinal bore 40 extending the entire length of the end member. A first pair of apertures 42 spaced 180° apart are provided in end face 36 and extend only partially through hub 34. A second pair of apertures 44, somewhat smaller and 90° apart from the first pair are positiioned in the slot 38 and extend completely through the hub.

Second end member 24 is substantially the same, in size and shape, as end member 22. There is a cylindrical portion 50 and an enlarged, coaxial hub 52 having a transverse end face 54. Slot 56 is formed in the end face in a plane perpendicular to longitudinal bore 58 extending the entire length of the end member. In contrast to the end member described first, end member 24 does not have any apertures in the end face thereof other than the longitudinal bore.

The central member 26 includes a flat disc 60 having a diametric dimension equal to the enlarged hub diameters of the end members. A central, axial bore 62 is provided in the disc and a pair of recesses 64 spaced 180° is also formed on the front surface 66 of the central member. It should be noted that the recesses are on a radius common with that of the apertures in the end face of member 22. It should be further noted that recesses 64 do not extend through to the rear surface 68.

A pair of precision stampings comprise front and rear strips, 70 and 72, respectively, and are permanently secured such as by welding, to the front and rear surfaces of disc 60 in order to make up the central member 26. Front strip 70 includes a central bore 74 and a pair of counterbored holes 76 therethrough. Holes 76 are 180° apart on a common radius and, in the assembled condition, are in registry with holes 44 in first end member 22 and holes 64 in disc 60. Strip 70 is dimensioned to be slidingly received in slot 38 in the first end member. The strips 70 and 72 are shaved after welding to the precise dimension required. This method of construction is less costly than milling.

Figure 6A:
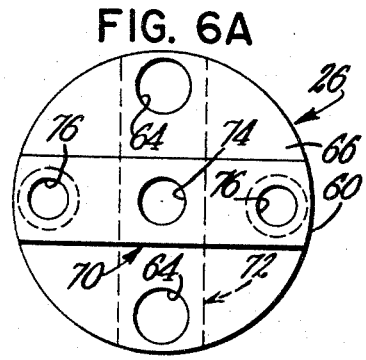
FIGS. 6A, 6B and 6C are front, side and rear elevational views of the central member.
Figure 6B:
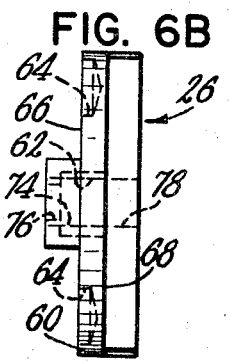
Figure 6C:
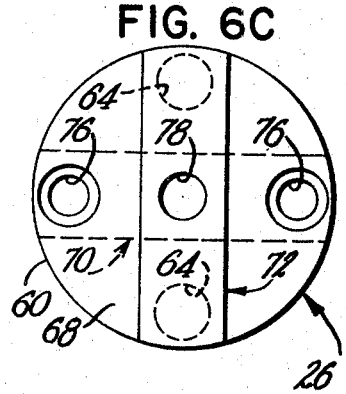
Figure 7:
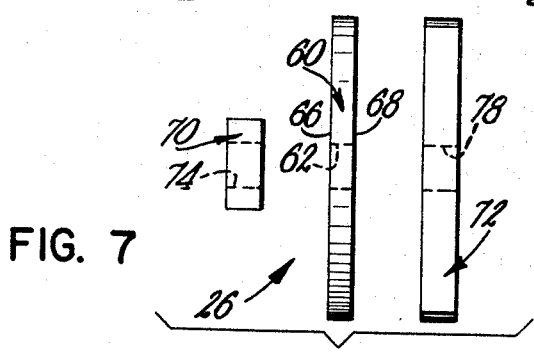
FIG. 7 is an exploded sectional side elevational view of a typical end member formed in accordance with this invention.

Second strip 72, having only a central bore 78, is permanently secured to the rear surface 68 of disc 60 and is dimensioned to be slidingly received in slot 56 in the second member when the opposed shafts are coupled. As may be seen in FIGS. 6A, 6B and 6C, the front and rear strips are accurately welded in place on disc 60 transversely to each other.

Referring now to FIG. 2 it will be seen that the first end member and the central member are loosely coupled to each other by fasteners 28. The shank of each fastener passes through a counterbored hole 76 in strip 70 and is disposed in a hole 44 in first end member 22. The head of each fastener is positioned in registered holes 76 and 64 in strip 70 and disc 60 and is captured by end face 54 of second member 24.

The shock absorbing means that prevents chatter and noise when the coupling is rotating is shown in FIG. 3. A pair of compression springs 30 are seated in apertures 42 formed in the end face of the first end member 22. The opposite end of each compression spring is disposed in holes 64 that are in disc 60 that is part of the central member 26.

From the foregoing description it will be seen that the fastening means are completely concealed and are captive when the shafts are coupled. Should the fasteners fail the loose parts cannot fall out and damage any of the associated equipment. Since the outer surface of the coupling is smooth and continuous there is little chance for dirt to accumulate. The apparatus is symmetrical and well balanced and may therefore be operated at high angular velocities. Further, the backlash error has been reduced and means are incorporated for minimizing chatter.

An important feature of this invention is that improved manufacturing and assembly techniques are used thus assuring a more accurate, a more reliable and a less costly device. Greater dimensional accuracy and lower costs are possible by precision stamping and then shaving or grinding the strips for the center member than by straddle milling or straddle grinding as was required by the prior art. For example, a center member manufactured according to the teachings of the present invention would cost approximately $0.60, whereas a comparable prior art member would cost $1.75.

FIG. 8 illustrates an alternative configuration for the center member. As in the previous embodiment, the machining of the center member is eliminated. Coupling 100 is comprised of end members 102 and 104 having tongues 106 and 108 formed integrally thereon. The operational axes of the tongues are displaced from each other by an angle of 90°. Center member 110 has two pairs of strips 112a, 112b and 114a, 114b welded to the opposed faces of disc 116 such that the opposed parallel edges of the pairs of strips define grooves. The strips are secured to the center disc such that the grooves each have an axis 90° displaced from the other and dimensioned so as to slidably receive the tongues.

The alternative embodiment shown in FIG. 9 illustrates a coupling 120 comprised of end members 122 and 124 having a tongue 126 and a groove defined by opposed, parallel walls 128a and 128b, respectively. As in the previous embodiments the tongue and groove are formed on the transverse end faces of the end members. In this embodiment the central member 130 has a disc 132 to which are welded a pair of strips 134a, 134b. The opposed parallel edges of the strips define a groove adapted to slidably mate with tongue 126. A tongue 136 is welded to the opposite face of the disc at an angle of 90° with respect to the groove defined by strips 134a, 134b, and is dimensioned to be slidably received in groove 128.

It should be noted that all of the above described embodiments have the common feature of strips welded to the center disc to provide tongues and/or grooves. In addition, the last two mentioned embodiments (FIG. 8 and FIG. 9) may also include the concealed and captured fasteners described in connection with the first embodiment. Thus, all of the embodiments may be manufactured more easily, at a lower cost and with greater accuracy than the prior art devices.

Although not specifically illustrated, the scope of the present invention may reasonably include the use of strips welded to the end members to provide tongues and/or grooves as desired. This would obviate the necessity of milling and grinding.

Having thus disclosed the best embodiment of the invention presently contemplated, it is to be understood that various changes and modifications may be made by those skilled in the art without departing from the spirit of the invention.

What is claimed is:
1. Apparatus for coupling two substantially coaxial shafts, said apparatus comprising:
 (a) a central member having a longitudinal axis and first and second surfaces transverse to the longitudinal axis;
 (b) a first end member adapted to be secured to one of the shafts to be coupled, said first end member having a transverse end face positioned in oppositon to said first surface of said central member;
 (c) a second end member adapted to be secured to the other shaft to be coupled, said second end member having a transverse end face positioned in opposition to said second surface of said central member;
 (d) first and second keying means rigidly attached to said first and second surfaces, respectively, of said central member, said first and second keying means each having an operational axis at 90° to the other;
 (e) third keying means integral with said end face of said first member and arranged to slidably mate with said first keying means;
 (f) fourth keying means integral with said end face of said second member and arranged to slidably mate with said second keying means; and

(g) fastening means loosely joining said central member to one of said end members,
   wherein said fastening means each have an enlarged head portion and a shank portion, said first end member having holes therein to receive said shank portions, said central member having counterbored holes in registry with the holes in said first end member, said head portions and said shank portions of said fastening means being disposed in the counterbored holes of said central member whereby said fastening means are completely concealed and captured by said second end member when the shafts are coupled.

References Cited

UNITED STATES PATENTS

| | | | |
|---|---|---|---|
| 1,277,363 | 9/1918 | Becht | 64—31 |
| 1,650,557 | 11/1927 | Weingartner | 64—31 |
| 2,447,424 | 8/1948 | Nightingale. | |
| 2,756,573 | 7/1956 | Colby et al. | 64—31 |
| 2,851,868 | 9/1958 | Larkin | 64—31 |
| 3,116,619 | 1/1964 | Spielbaur | 64—31 |

FOREIGN PATENTS 550,377    5/1932    Germany.

HALL C. COE, *Primary Examiner.*